Figure 1:
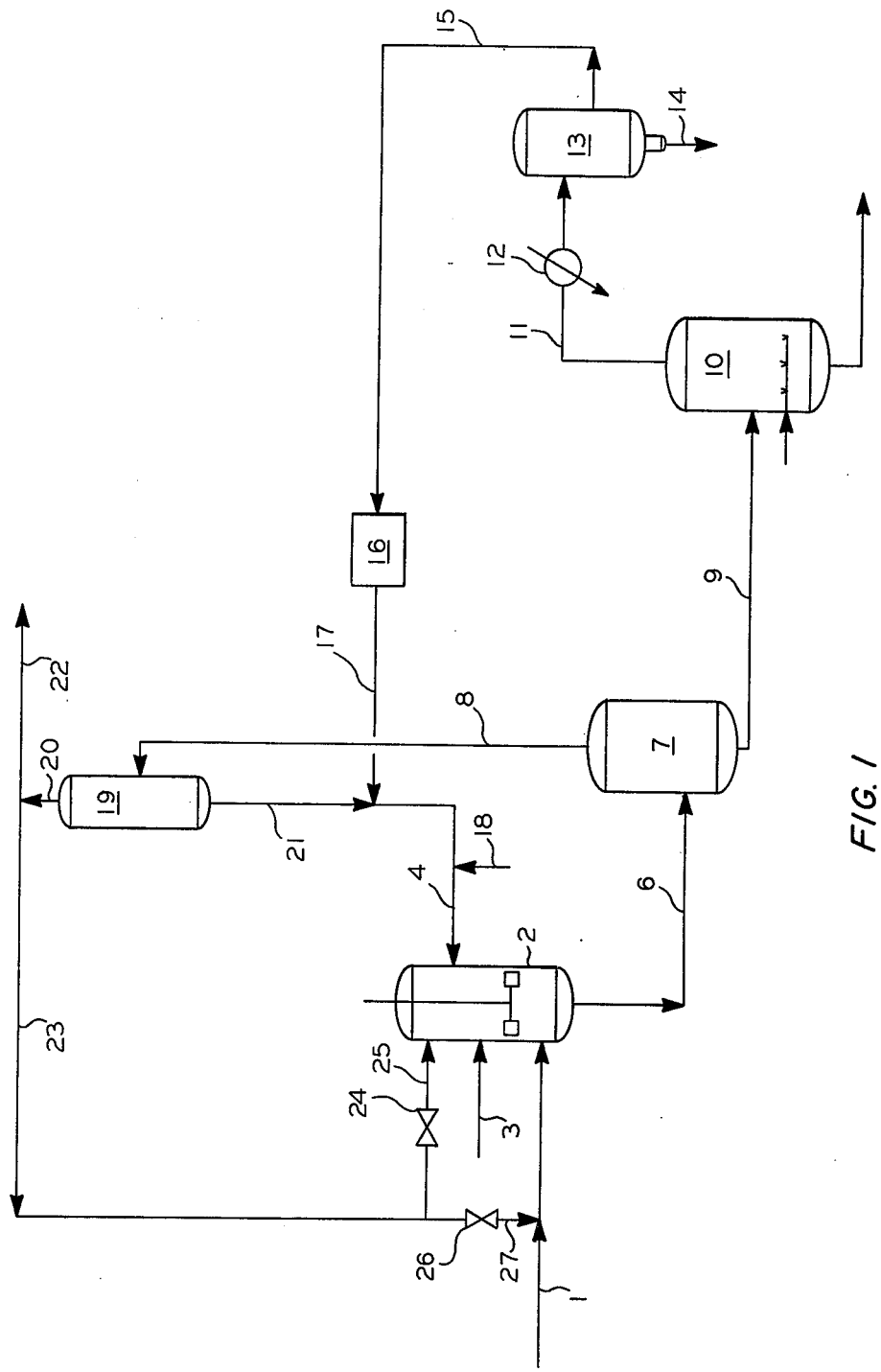

United States Patent [19]

Hubby

[11] 4,271,060

[45] Jun. 2, 1981

[54] SOLUTION POLYMERIZATION PROCESS

[75] Inventor: John S. Hubby, Brussels, Belgium

[73] Assignee: Phillips Petroleum Company, Bartlesville, Okla.

[21] Appl. No.: 76,104

[22] Filed: Sep. 17, 1979

[51] Int. Cl.³ ............................................. C08K 5/01
[52] U.S. Cl. .............................. 260/33.6 A; 526/335; 526/903; 528/501
[58] Field of Search .................. 260/33.6 A; 528/501; 526/335, 903

[56] References Cited

U.S. PATENT DOCUMENTS

| | | | |
|---|---|---|---|
| 3,163,630 | 12/1964 | Pampus et al. | 526/335 |
| 3,225,021 | 12/1965 | Erchak | 526/68 |
| 3,462,347 | 8/1969 | Chapman et al. | 203/6 |
| 3,470,070 | 9/1969 | Heckart | 528/501 |
| 3,658,776 | 4/1972 | Naylor | 526/335 |
| 3,725,377 | 4/1973 | Cottle | 526/70 |
| 3,932,371 | 1/1976 | Powers | 526/70 |

*Primary Examiner*—Lewis T. Jacobs

[57] ABSTRACT

A solution polymerization process in which polymerizable diolefin monomer, is contacted under polymerization conditions in the presence of a volatile and inert earth hydrocarbon diluent having 3 to 5 carbon atoms per molecule and a hydrocarbon solvent having 6 to 10 carbon atoms per molecule to yield a product mixture easily concentrated by flash evaporation. In preferred embodiments the diluent is present in an amount such that the monomer concentration is about 30 to about 45 weight percent in the total of monomer and diluent entering the reaction and the solvent is present in an amount such that the weight ratio of the total of solvent and diluent to monomer entering the reaction is in the range of about 4:1 to 12:1.

5 Claims, 1 Drawing Figure

SOLUTION POLYMERIZATION PROCESS

BACKGROUND OF THE INVENTION

This invention relates to solution polymerization. In one of its aspects this invention relates to the production of solution rubber polymers. In another of its aspects this invention relates to the recovery of polymers from a solution polymerization process.

Most solution polymerization processes such as that disclosed in U.S. Pat. No. 3,462,347 use a hydrocarbon such as n-hexane, cyclohexane or toluene as a reaction solvent medium. In the recovery of product, the reactor effluent is usually flash concentrated, followed by steam stripping to remove the balance of the solvent, with final recovery of the product as a crumb in water slurry. In such a process the solvent recovered by steam stripping must be dried before it can be recycled to the reactor.

It has also recently been a practice, as shown in U.S. Pat. No. 3,725,377, to purify low concentration monomers by hydrogenation and adsorption so that the use of extensive fractionation and extractive distillation can be avoided in purifying monomers. This has provided a more economical feedstock for polymer production, particularly in the production of solution rubber.

Up to now, it has not been generally recognized that the presence of substantially inert light hydrocarbons in the feed to the reactor in the polymerization of diolefins can have two important advantages in subsequent solvent removal: (1) the presence of inert light hydrocarbons can allow the reaction operator to remove or "back out" part of the reactor solvent but maintain operation of a solution polymerization reactor at the same polymer solids concentration using a reduced amount of heavier hydrocarbon solvent, and (2), because the inert light hydrocarbons are both more volatile and have a lower latent heat of evaporation than the heavier hydrocarbons used as solvent, the reactor effluent can be flashed to a higher polymer concentration so that the amount of solvent to be removed in the subsequent energy intensive steam stripping step can be reduced.

It is therefore an object of this invention to provide a method for producing solution polymerized polymer that uses less energy in the solvent removal step than processes presently employed. It is another object of this invention to provide a solution polymerization method that facilitates the concentration of polymer in the reaction effluent.

Other aspects, objects, and the various advantages of this invention will become apparent upon reading this specification, studying the drawing, and reading the appended claims.

STATEMENT OF THE INVENTION

In accordance with this invention a process is provided for producing solution polymerized polymer in which a polymerizable diolefin monomer is contacted under polymerization conditions in the presence of a volatile inert hydrocarbon diluent having from 3 to 5 carbon atoms per molecule and a hydrocarbon solvent having 6 to 10 carbon atoms per molecule. The presence of the volatile inert hydrocarbon diluent as a replacement for a portion of the hydrocarbon solvent normally used permits the flashing of a greater amount of hydrocarbon vapor in a subsequent flashing step thereby facilitating concentration of the polymer in the reaction effluent.

In a preferred embodiment of the invention the volatile inert hydrocarbon diluent is present in the contacting mixture in an amount such that the monomer concentration is about 30 to about 45 weight percent in the total of monomer and diluent entering the reactor and the hydrocarbon solvent is present in an amount such that the weight ratio of total solvent and diluent to monomer entering the reactor is in the range of about 4:1 to 12:1. It has been found that the use of volatile inert hydrocarbon diluent in the amounts disclosed above permits the flashing of about twice as much hydrocarbon vapor (solvent + a volatile diluent) in a subsequent flashing step than can be flashed without using the volatile hydrocarbon diluent thereby reducing the amount of solvent to be removed by steam stripping by about 20 percent. As an added advantage, the flashed hydrocarbons may be recycled to the reaction without being dried.

The invention is applicable to the production of solution polymers, particularly solution rubbers such as polybutadiene, polyisoprene, butadiene-styrene and butadiene-methylstyrene copolymers and the like. The invention will also find utility in the production of other solution polymers of diolefins such as copolymers with other diolefins or with olefins.

Monomers which can be employed in the preparation of polymers are the conjugated dienes containing from 4 to 12 carbon atoms, preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, for example, halogenated dienes such as chloroprene, fluoroprene, etc. In addition to styrene, aryl-substituted olefins such as alkyl styrenes, p-methoxy styrenes, vinyl naphthalene, vinyl toluene, and the like, and heterocyclic nitrogen-containing monomers such as pyridine and quinoline derivatives can be used. Additionally, when the invention is to be used in the preparation of copolymers with olefins, suitable monomers would include $\alpha$-olefins containing 2 to 10 carbon atoms.

Any suitable polymerization catalyst can be used in the reaction. In the case of rubbery polymers, these catalysts are generally organo compounds of alkali metals which may be used along with various modifiers or adjuvants known in the art.

Solvents useful in practicing the invention are hydrocarbons, e.g., paraffins, naphthenes and aromatics, containing from 6 to about 10 carbon atoms and include n-hexane, n-heptane, isooctane, cyclohexane, methylcyclohexane, benzene, toluene, xylene and the like or mixtures thereof.

The volatile hydrocarbon diluents useful in the invention are $C_3$–$C_5$ hydrocarbons which are inert in the polymerization reaction including propane, isobutane, butylenes, pentenes and the like. In the case of copolymerizations with olefins, of course, only saturated hydrocarbons would be useful.

The process of the invention is illustrated in the attached FIGURE which is a schematic drawing of the process.

Referring now to the FIGURE, one or more monomers are introduced by line (1) into reactor (2) in which polymerization occurs in the presence of a catalyst which is introduced by line (3) and solvent introduced through line (4). Light hydrocarbon diluent in line (23) can, by selectively closing valves (24) and (26), be directed through line (25) directly into reactor (2) or can be combined through line (27) with the entering monomer stream.

After contact of the components in the reactor (2) under polymerization conditions which are well known in the art and are, therefore, not part of this invention, such as the conditions disclosed in U.S. Pat. Nos. 3,560,593, 3,658,776, and 3,763,126, reactor effluent passes by line (6) to flash zone (7). In this flash zone most of the light hydrocarbon diluent and some solvent are removed as vapor by line (8). Concentrated polymer solution is passed through line (9) to steam stripping zone (10) in which essentially all of the remaining solvent and diluent are removed by steam stripping and passed by line (11), through condenser (12) to separator (13) from which water is withdrawn by line (14) and recovered solvent is returned through line (15), drying zone (16) and lines (17), (4) to the reactor (2). Make up solvent can be introduced through line (18) into line (4).

The flashed diluent-solvent from the flash zone (7) is passed through line (8) to be separated in fractionator (19) into light hydrocarbon diluent which is passed overhead through line (20) and recycle solvent which is recycled from the base of fractionator (19) through line (21). The diluent stream (20) can be recycled to the reactor by line (23) or discarded through line (22).

The following calculated example illustrates the benefits for use of the invention in the manufacture of polybutadiene as compared to conventional operation with either high purity or 50 percent purity feeds.

EXAMPLE 1

Butadiene is polymerized to polybutadiene in n-hexane solvent using n-butyl lithium catalyst as disclosed in U.S. Pat. No. 3,462,347. Three cases are compared: (1) 98 weight percent butadiene feed, (2) 50 percent butadiene feed and (3) butadiene feed diluted with recycle $C_4$'s to provide a butadiene concentration in the total $C_4$ stream of 33 percent. Solvent-to-monomer weight ratio is 8:1 in all cases with diluent $C_4$ replacing its weight in solvent in the latter two cases. Reactor conditions are 220° F. (104° C.) and appropriate pressure to maintain the contents in liquid phase, and flash condition are about 170° F. (77° C.) and 20 psia. Flow rates are in kilograms per hour.

| Feed | High Purity Butadiene | | 50 Wt % Butadiene | | Butadiene Diluted to 33 Wt % | |
|---|---|---|---|---|---|---|
| | Reactor Feed | Flash Effluent to Stripper | Reactor Feed | Flash Effluent to Stripper | Reactor Feed | Flash Effluent to Stripper |
| Butadiene | 2,500 | — | 2,500 | — | 2,500 | — |
| N-Hexane | 20,000 | 17,500 | 17,500 | 16,400 | 15,000 | 13,300 |
| $C_4$ Hydrocarbons | — | — | 2,500 | 700 | 5,000 | 1,000 |
| Polymer | — | 2,500 | — | 2,500 | — | 2,500 |
| | 22,500 | 20,000 | 22,500 | 19,600 | 22,500 | 16,800 |
| Percent Butadiene | 11.1 | — | 11.1 | — | 11.1 | — |
| Percent Solids | — | 12.5 | — | 12.8 | — | 14.9 |

EXAMPLE 2

Similarly, a butadiene-styrene random copolymer is produced by polymerizing these monomers in 3:1 weight ratio using n-hexane solvent and n-butyl lithium catalyst using a solvent-to-monomer weight ratio of 6:1 with the following results:

| Feed | High Purity Butadiene | | 50 Wt % Butadiene | | Butadiene Diluted to 33 Wt % | |
|---|---|---|---|---|---|---|
| | Reactor Feed | Flash Effluent to Stripper | Reactor Feed | Flash Effluent to Stripper | Reactor Feed | Flash Effluent to Stripper |
| Butadiene | 1,875 | — | 1,875 | — | 1,875 | — |
| Styrene | 625 | — | 625 | — | 625 | — |
| N-Hexane | 15,000 | 13,000 | 13,125 | 12,125 | 11,250 | 9,850 |
| $C_4$ Hydrocarbons | — | — | 1,875 | 400 | 3,750 | 550 |
| Polymer | — | 2,500 | — | 2,500 | — | 2,500 |
| | 17,500 | 15,500 | 17,500 | 15,025 | 17,500 | 12,900 |
| Percent Monomers | 14.3 | — | 14.3 | — | 14.3 | — |
| Percent Solids | — | 16.1 | — | 16.6 | — | 19.4 |

It may be observed from the above results that the stripper load is greatly decreased with butadiene dilution to about 33 percent, the solids to the stripper increasing from 12.5 to 14.9 weight percent for the homopolymer case and from 16.1 to 19.4 weight percent in the copolymer case.

I claim:

1. A process for producing solution polymerized polymer comprising:
   (a) contacting in a contacting zone under polymerization conditions the reaction mixture comprising:
      (1) polymerizable diolefin monomer,
      (2) a volatile inert hydrocarbon diluent having 3 to 5 carbon atoms per molecule, and
      (3) a hydrocarbon solvent having 6 to 10 carbon atoms per molecule;
   (b) removing from the contacting zone a reaction mixture effluent; and
   (c) flashing said reaction mixture effluent under conditions to vaporize at least a portion of the diluent and solvent thereby concentrating the polymer product.

2. A process of claim 1 wherein said diluent is present in an amount such that the monomer concentration is about 30 to about 45 weight percent in the total of monomer and diluent entering the reactor and said solvent is present in an amount such that the weight ratio of the total solvent and diluent to monomer entering the reactor is in the range of about 4:1 to 12:1.

3. A method of claim 1 wherein said portion of the diluent and solvent flashed under conditions to vaporize said portion is further treated to separate the diluent and the solvent thereby producing a separated diluent stream and a separated solvent stream.

4. A method of claim 3 wherein said separated diluent stream is recycled to the reaction mixture under polymerization conditions.

5. A method of claim 3 wherein said separated solvent stream is recycled to the reaction mixture under polymerization conditions.

* * * * *